US008146871B1

(12) United States Patent
Kulp et al.

(10) Patent No.: US 8,146,871 B1

(45) Date of Patent: Apr. 3, 2012

(54) PORTABLE SIGN STAND

(76) Inventors: Jack H. Kulp, Dana Point, CA (US); Geoffrey B. Maus, Mission Viejo, CA (US); Felipe Almanza, Perris, CA (US)

( * ) Notice: Subject to any disclaimer, the term of this patent is extended or adjusted under 35 U.S.C. 154(b) by 0 days.

(21) Appl. No.: 11/935,085

(22) Filed: Nov. 5, 2007

Related U.S. Application Data

(60) Provisional application No. 60/856,521, filed on Nov. 3, 2006.

(51) Int. Cl.
*F16M 11/00* (2006.01)

(52) U.S. Cl. ........................ 248/176.1; 248/168; 40/610

(58) Field of Classification Search ............... 248/176.1, 248/441.1, 168, 170, 173, 177.1, 519, 523, 248/163.1, 127, 459, 460, 464, 165, 166, 248/440.1; 40/610, 612, 607.1
See application file for complete search history.

(56) References Cited

U.S. PATENT DOCUMENTS

| | | | | | |
|---|---|---|---|---|---|
| 627,170 | A * | 6/1899 | Austin | 248/170 |
| 751,140 | A * | 2/1904 | Beecroft | 248/125.8 |
| 877,268 | A * | 1/1908 | Van Buren | 52/165 |
| 1,217,606 | A * | 2/1917 | Kane | 384/24 |
| 1,708,761 | A * | 4/1929 | Horbath | 248/185.1 |
| 1,959,886 | A * | 5/1934 | Wadsworth | 239/280.5 |
| 2,059,996 | A * | 11/1936 | Goldberg | 40/610 |
| 2,653,000 | A * | 9/1953 | Cadwell et al. | 248/168 |
| 2,832,555 | A * | 4/1958 | Terhune | 248/170 |
| 2,845,243 | A * | 7/1958 | Mowers et al. | 248/536 |
| 2,940,709 | A * | 6/1960 | Neuwirth | 248/168 |
| 3,480,250 | A * | 11/1969 | Hankins | 248/168 |
| 3,741,509 | A * | 6/1973 | Kelly | 248/171 |
| 4,309,836 | A * | 1/1982 | Knapp | 40/602 |
| 4,609,174 | A * | 9/1986 | Nakatani | 248/465 |
| 4,888,894 | A * | 12/1989 | Brown, Jr. | 40/607.02 |
| 5,446,984 | A | 9/1995 | Kulp et al. | |
| 5,540,007 | A | 7/1996 | Kulp et al. | |
| 5,624,092 | A | 4/1997 | Kulp et al. | |
| 5,732,911 | A | 3/1998 | Kulp et al. | |
| 5,749,549 | A * | 5/1998 | Ashjaee | 248/168 |
| 5,755,528 | A | 5/1998 | Kulp et al. | |
| 5,836,558 | A | 11/1998 | Kulp et al. | |
| 5,915,672 | A * | 6/1999 | Dickey | 254/133 R |
| 6,003,827 | A | 12/1999 | Kulp et al. | |
| 6,047,941 | A | 4/2000 | Kulp et al. | |
| 6,347,773 | B1 * | 2/2002 | Gross et al. | 248/176.1 |
| 6,430,855 | B1 | 8/2002 | Gertz et al. | |
| 7,293,753 | B1 * | 11/2007 | Kapp | 248/464 |
| 7,350,328 | B1 | 4/2008 | Garcia | |

* cited by examiner

*Primary Examiner* — Kimberly Wood

(74) *Attorney, Agent, or Firm* — Stout, Uxa, Buyan & Mullins, LLP; Donald E. Stout

(57) ABSTRACT

A portable sign stand comprises a mast for supporting an article (preferably a sign) thereon and a plurality of support legs for supporting the mast. A heart plate assembly comprises a heart plate for pivotally receiving and attaching to top ends of each of the plurality of support legs and a center tube having a hollow interior for slidably receiving the inner mast. The center tube extends upwardly a predetermined distance from a top edge of the heart plate. This predetermined distance is at least two inches in order to protect a user's fingers in the event of an inadvertent or intentional dropping of the inner mast downwardly through the hollow interior of the center tube to its minimum height position. In the most preferred embodiments, the minimum predetermined distance is at least about four inches, because this distance permits an average user's hand to be entirely wrapped about the center tube without the risk of a pinch injury if the mast is suddenly dropped to its minimum height position.

4 Claims, 3 Drawing Sheets

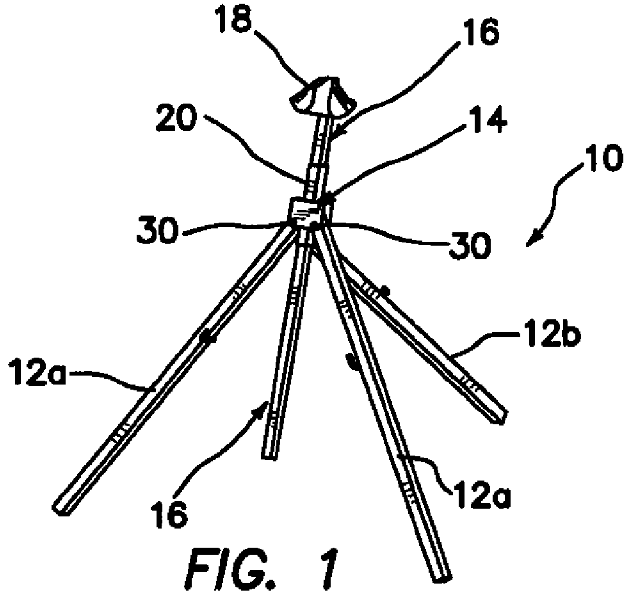
FIG. 1
FIG. 2
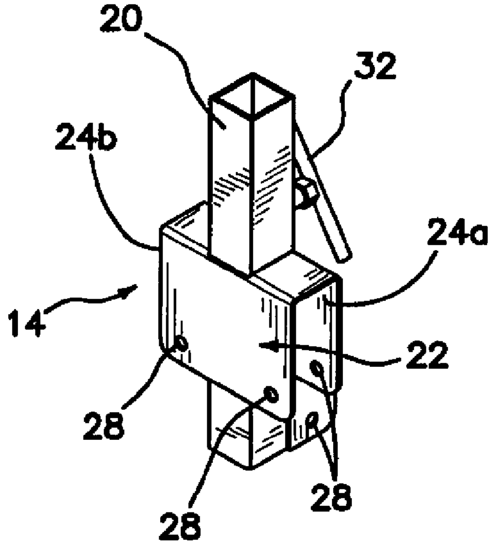
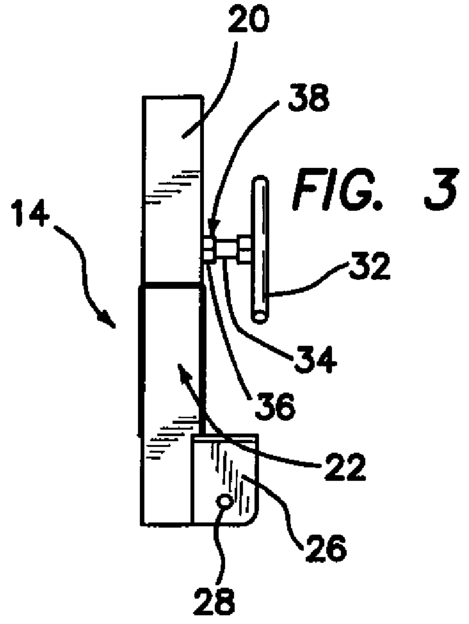
FIG. 3
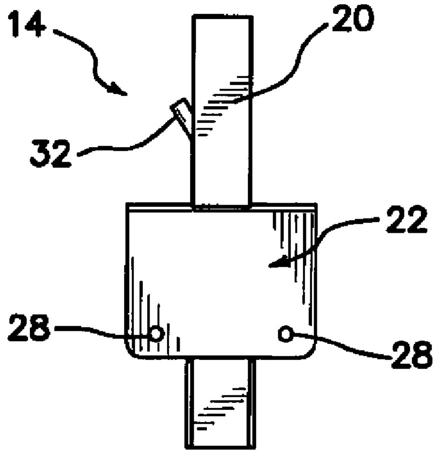
FIG. 4
FIG. 5
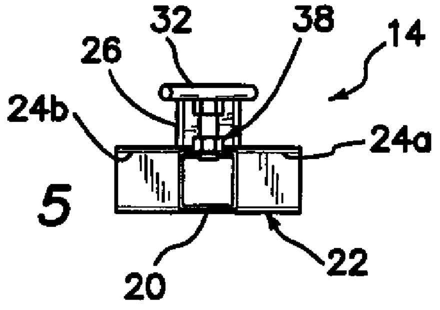

FIG. 6
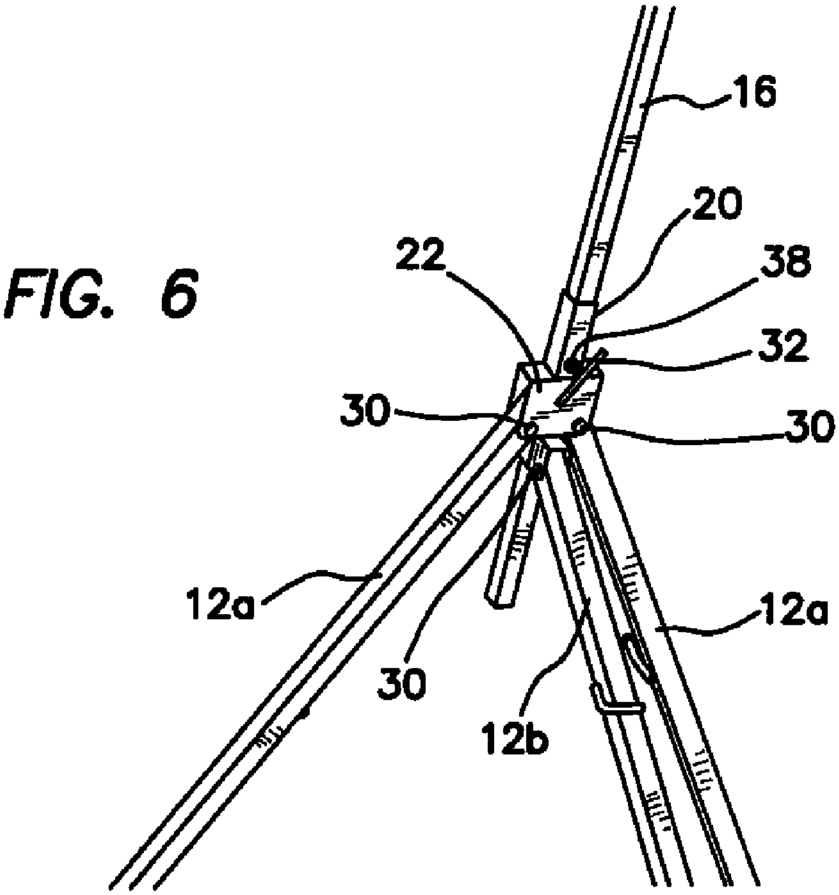
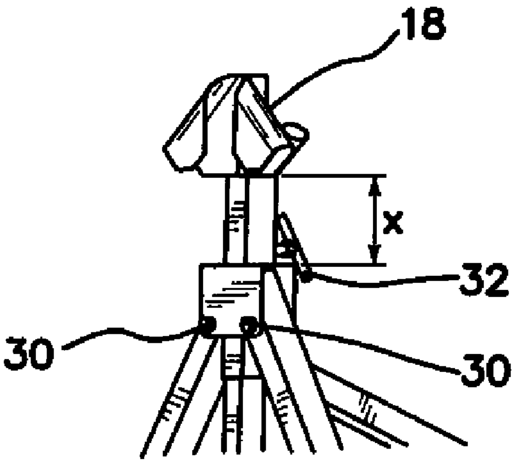
FIG. 7

FIG. 8
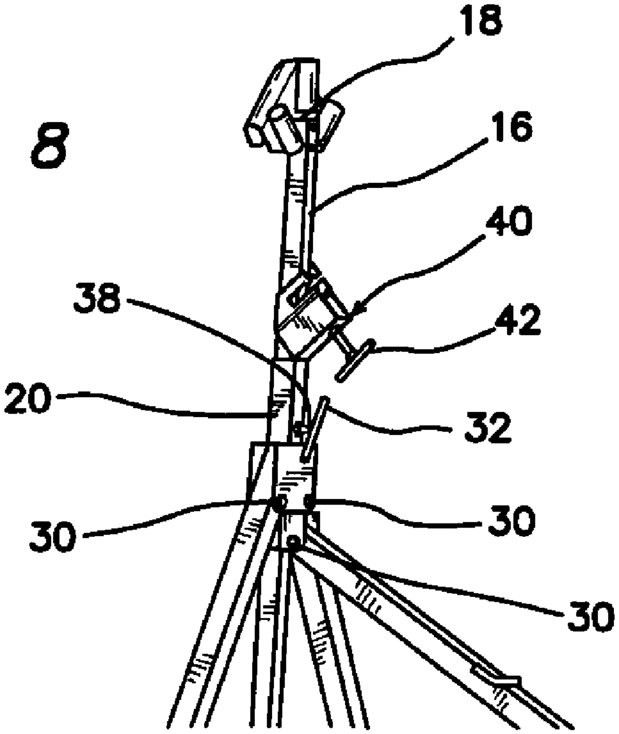
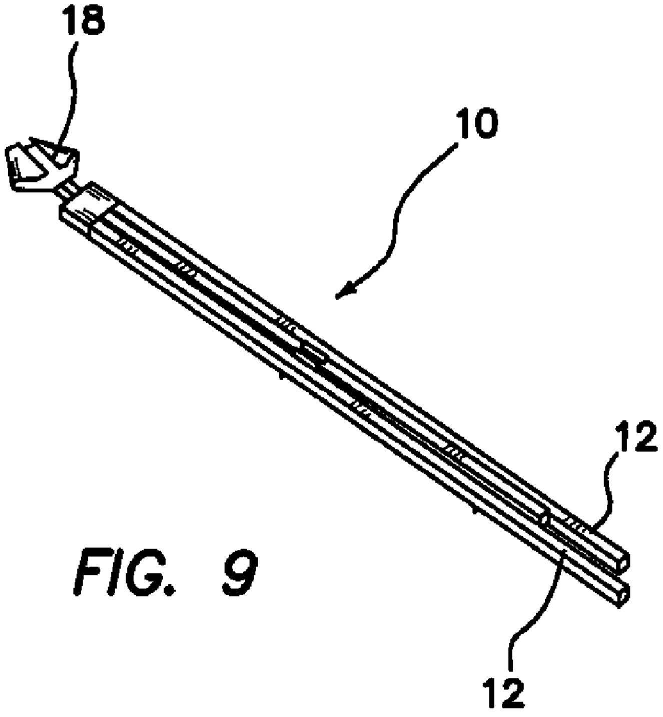
FIG. 9

PORTABLE SIGN STAND

This application claims the benefit under 35 U.S.C. 119(e) of the filing date of Provisional U.S. Application Ser. No. 60/856,521, entitled Sign Stand, filed on Nov. 3, 2006. This provisional application is expressly incorporated herein, in its entirety, by reference.

BACKGROUND OF THE INVENTION

This application relates to signs and message display devices, and more particularly to portable sign stands, typically made of metal, for supporting and displaying such signs.

Signs used in the roadway construction field may be of the rigid type, constructed of metal, plywood, or the like, or may be of the flexible type, constructed of fabric or vinyl and designed to roll up for transport and storage when not in use. The signs may be of any shape, such as diamond, square, rectangular, or circular, and may be of varying sizes, depending upon the distance from which the signs must be viewed.

Portable, metallic sign stands are commonly used to support both rigid and flexible or roll-up types of signs. These portable sign stand typically comprise a plurality of foldable legs secured by a heart plate at their upper ends thereof. A mast is also supported by the heart plate, extending upwardly therefrom to support an article, which is most typically either a rigid or roll-up sign panel. Brackets of an appropriate type are disposed on the mast from which the sign panel may be supported.

SUMMARY OF THE INVENTION

The present invention comprises a portable sign stand which comprises a mast for supporting an article (preferably a sign) thereon and a plurality of support legs for supporting the mast. A heart plate assembly comprises a heart plate for pivotally receiving and attaching to top ends of each of the plurality of support legs and a center tube having a hollow interior for slidably receiving the inner mast.

Advantageously, in the present invention, the center tube extends upwardly a predetermined distance from a top edge of the heart plate. This predetermined distance is at least two inches in order to protect a user's fingers in the event of an inadvertent or intentional dropping of the inner mast downwardly through the hollow interior of the center tube to its minimum height position. More particularly, and in the most preferred embodiments, the minimum predetermined distance is at least about four inches, because this distance permits an average user's hand to be entirely wrapped about the center tube without the risk of a pinch injury if the mast is suddenly dropped to its minimum height position. In the prior art, such an event often results in a pinch injury to the user's fingers or hand because there is substantially no clearance between the heart plate and a bracket which may be disposed on the mast when the mast is at its minimum height position, so the bracket will contact the user's fingers or hand and smash it or them between the bracket and the heart plate.

A bracket is typically disposed on the mast for supporting the sign. The heart plate assembly further comprises a clamping mechanism for clamping the inner mast in a desired position relative to the center tube. The clamping mechanism preferably comprises a shaft extending through a portion of the heart plate and an adjacent portion of the center tube, and into the hollow interior of the center tube. The clamping mechanism further comprises a handle on a proximal end of the shaft for rotating the shaft.

The heart plate comprises opposing open ends into which the top ends of two of the support legs are inserted, as well as fastener apertures disposed adjacent to each of the open ends for receiving shaft fasteners to create the pivotal attachment.

The heart plate further comprises a horse collar into which a third one of the support legs is inserted, as well as fastener apertures disposed on the horse collar for receiving a shaft fastener to create the pivotal attachment.

The invention, together with additional features and advantages thereof, may best be understood by reference to the following description taken in conjunction with the accompanying illustrative drawing.

BRIEF DESCRIPTION OF THE DRAWINGS

FIG. 1 is a perspective view of a portable sign stand constructed in accordance with the principles of the present invention;

FIG. 2 is a perspective view of the heart plate portion of the sign stand of FIG. 1;

FIG. 3 is a side view of the heart plate portion of FIG. 2;

FIG. 4 is a rear view of the heart plate portion of FIGS. 2 and 3;

FIG. 5 is a top view of the heart plate portion of FIGS. 2-4;

FIG. 6 is a perspective view of a portion of the sign stand of FIG. 1;

FIG. 7 is a perspective view of the upper portion of the sign stand of FIG. 1;

FIG. 8 is a side view of the sign stand of FIG. 1; and

FIG. 9 is a perspective view illustrating a sign stand of the present invention in a folded configuration.

DESCRIPTION OF THE PREFERRED EMBODIMENT

Referring now more particularly to the drawings, in FIG. 1 there is illustrated a portable sign stand 10 constructed in accordance with one embodiment of the present invention. The sign stand 10 comprises a plurality of support legs 12, creating a tripod support for the stand 10. The three legs 12, more particularly comprising two front legs 12*a* and a rear leg 12*b*, are all joined at a heart plate assembly 14, which is shown in more detail in FIGS. 2-5. Extending through the heart plate assembly 14 is an inner mast 16, for supporting either a rigid or flexible roll-up sign panel. A bracket 18 is shown installed on a top end of the mast 16 for use in securing a rigid sign (not shown) in place on the mast. The mast 16 may comprise either a single piece or telescoping two piece mast, both of which are known in the art, and is typically comprised of a length of steel square tube.

Now with particular attention to FIGS. 2-5, the heart plate assembly 14 is shown in greater detail. The heart plate assembly 14 comprises a center tube 20 which extends through a heart plate 22. To assemble the sign stand, the top ends of each of the front legs 12*a* are inserted into opposing open ends 24*a*, 24*b* of the heart plate 22. The third, rear leg 12*b* is inserted into a rear mounting receptacle or horse collar 26 on the heart plate assembly. Corresponding opposed fastener apertures 28 are provided, as shown, on each opposing open end 24*a*, 24*b*, respectively, of the heart plate 22, and on the horse collar 26. The legs 12*a* and 12*b* are secured to their mounting attachments as described above by the use of bolts 30, which extend through the respective corresponding apertures 28, as well as through corresponding apertures (not shown) in the top ends of each of the three legs 12*a*, 12*a*, and 12*b*.

In the illustrated embodiment, the bolts 30 comprise 5/16 in. bolts, with elastic stopnut assemblies on each end thereof. As a result, for each leg 12, the attachment to the heart plate assembly 14 is a pivotable attachment. Accordingly, the legs 12 may be pivoted relative to one another and to the heart plate assembly, between deployed orientations, such as are shown in FIGS. 1 and 6-8, and a stored orientation, such as is shown in FIG. 9.

A handle 32 and associated threaded shaft 34, together with a nut 36, together form a clamping mechanism 38 for clamping the inner mast 16 relative to the center tube 20. When the handle 32 is rotated in a clockwise direction, the shaft 34 is advanced because of the threaded engagement between the shaft 34 and the nut 36, until it contacts the inner mast 16 within the center tube 20 so that the mast 16 is clamped in place within the walls of the center tube. On the other hand, when the handle 32 is rotated in a counterclockwise direction, the shaft 34 moves proximally to release the mast 16 so that it is free to be adjusted upwardly and downwardly relative to the center tube 20.

In a particular preferred embodiment, the heart plate assembly 14 comprises 14 gauge mild steel sheet and 1¼ inch×1¼ inch gauge wall mild steel square tube. The overall dimensions for the heart plate assembly 14 are approximately 4 inches wide by 9¼ inches tall by approximately 3 inches thick. The total weight of the heart plate assembly is approximately 1½ pounds. Of course, these particular dimensions are exemplary only, and not critical to the invention, as various suitable materials and dimensions may be utilized.

Each of the front legs 12*a* and the rear leg 12*b* includes an angled cut on its top end (not shown), so that, in the deployed position of the stand 10 the angled cut at the top of each front leg securely stops against the center tube 20 of the heart plate assembly 14. This secure stop sets the angle at which the front legs 12*a* and rear leg 12*b* splay when the stand is in the deployed position. Thus, the desired final deployed angle of splay of the legs can be achieved by cutting the top end of each leg to the same angle.

The telescoping inner mast 16 is captured by the center tube 20. The inner mast 16 is sized so that it permits free movement vertically inside of the center tube 20, which is preferably constructed of 1¼ inch×1¼ inch 14 gauge mild steel (though, of course, other suitable materials and sizes may be employed). When the inner mast 16 is set to a desired height, the inner mast 16 is locked into position, to hold the inner mast at that height relative to the center tube 20, by tightening the handle 32.

The height of the center tube 20 above the top of the heart plate assembly 14 is a designed height that minimizes the chance of "pinch point" injury to the fingers or hand of a user, when the inner mast 16 is inadvertently allowed to fall from an extended position, as is quite common in practice. This event typically occurs if the clamping mechanism 38 is released, permitting the mast to slidably fall downwardly through the center tube 20, until the bracket 18 impacts the top of the center tube 20. FIG. 7 illustrates this minimum height or clearance X, which is the distance by which the center tube 20 extends above the heart plate. In preferred embodiments, this distance or clearance X is a minimum of about 4 inches, because this distance permits an average user's whole hand to be wrapped about the center tube above the heart plate without fear that an inadvertent (or intentional) dropping of the interior mast to its minimum height position will cause a pinch injury to the hand by, for example, the bracket 18 (FIG. 7). However, in other embodiments, the minimum clearance or distance X could be less, though it should be no less than about 2 inches (sufficient to protect two adjacent fingers which are inadvertently disposed above the heart plate when the mast is dropped to its minimum height, either inadvertently or intentionally).

In contrast, in typical prior art sign stands of this type, if the mast falls to its lowest point, there is substantially no clearance between the heart plate and the bracket on top of the mast. Thus, if a user's fingers are in proximity to the heart plate, they are vulnerable to being pinched and seriously injured in such an event.

As shown in FIG. 8, this sign stand may advantageously be used with a roll-up sign bracket 40. This sign bracket 40 is described and claimed in co-pending U.S. application Ser. No. 11/935,074, entitled Roll-Up Sign Mounting Bracket, filed on even date herewith and commonly assigned, which application is herein expressly incorporated by reference, in its entirety. The above noted distance or clearance X is also designed to prevent interference of the handle 32 for retaining the mast 16 in position, with the handle 42 on the bracket 40. With the bracket 40 installed on the mast 16, the height of the center tube 20 above the heart plate also allows unimpeded access to both the handle 32 on the heart plate assembly 14 and the bracket handle 42. This improved access exists whether the bracket 40 is in its operational or non-operational orientation.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A portable sign stand comprising:

a mast for supporting a sign thereon;

a bracket disposed on said mast for supporting said sign;

a plurality of support legs for supporting the mast; and a heart plate assembly comprising a heart plate for pivotally receiving and attaching to top ends of two of said plurality of support legs, said heart plate being a unitary piece comprising opposing open ends into which the top ends of two of said support legs are inserted, fastener apertures disposed adjacent each of said open ends for receiving shaft fasteners to create said pivotal attachment, and a horse collar into which a third one of said support legs is inserted, fastener apertures being disposed on said horse collar for receiving a shaft fastener to create said pivotal attachment, said heart plate further comprising a top planar surface with an aperture structured and adapted to accommodate a center tube therethrough that is substantially orthogonally disposed relative to said top planar surface of the heartplate, said center tube having a hollow interior for slidably receiving said mast, said center tube extending through said heart plate and having a lower end which extends below a bottom edge of said heart plate;

wherein an upper end of said center tube extends upwardly a fixed predetermined distance of at least four inches from the top planar surface of said heart plate and wherein said fixed predetermined distance of said center tube is adapted to allow an average user's whole hand to be wrapped around it in order to prevent pinch point injury while adjusting the length of said mast.

2. The portable sign stand as recited in claim 1, wherein said heart plate assembly further comprises a clamping mechanism for clamping said mast in a desired position relative to said center tube.

3. The portable sign stand as recited in claim 2, wherein said clamping mechanism comprises a shaft extending through a portion of said heart plate and an adjacent portion of said center tube, and into the hollow interior of said center tube.

4. The portable sign stand as recited in claim 3, said clamping mechanism further comprising a handle on a proximal end of the shaft for rotating the shaft.

* * * * *